United States Patent [19]

Patel et al.

[11] Patent Number: 5,725,271
[45] Date of Patent: Mar. 10, 1998

[54] ENERGY ABSORBING AUTOMOTIVE VEHICLE BODY STRUCTURE

[75] Inventors: Rasik N. Patel, Canton; Guy Allen Breckenridge, Westland; Saeed David Barbat, Farmington Hills, all of Mich.

[73] Assignee: Ford Global Technologies, Inc., Dearborn, Mich.

[21] Appl. No.: 788,097

[22] Filed: Jan. 23, 1997

[51] Int. Cl.$^6$ .................................................... B60R 21/09
[52] U.S. Cl. ............................................ 296/189; 280/751
[58] Field of Search ............................ 296/189; 280/751, 280/752; 180/90

[56] References Cited

U.S. PATENT DOCUMENTS

| | | | |
|---|---|---|---|
| 3,779,595 | 12/1973 | Suzuki et al. | 296/189 |
| 3,831,705 | 8/1974 | Glance | 180/90 |
| 5,066,064 | 11/1991 | Garnweidner | 296/189 X |
| 5,163,730 | 11/1992 | Welch | 296/189 |
| 5,445,430 | 8/1995 | Nichols | 280/751 X |
| 5,544,933 | 8/1996 | Shahab et al. | 296/189 |
| 5,575,500 | 11/1996 | Mimura et al. | 280/751 |
| 5,609,385 | 3/1997 | Daniel et al. | 296/189 X |

*Primary Examiner*—Joseph D. Pape
*Attorney, Agent, or Firm*—Daniel M. Stock, Esq.; Roger L. May, Esq.

[57] ABSTRACT

An automotive vehicle body structure includes a structural member which forms a load-bearing portion of the vehicle and a trim component mounted to the structural member. A plurality of energy absorbing elements are mounted to the trim component and spaced relative to one another along the longitudinal length of the trim component. Each of the energy absorbing elements have a serpentine shape and extend from the trim component toward the structural member such that the distal ends of the energy absorbing elements are spaced from, but adjacent to, the structural member in non-contacting relationship therewith. The energy absorbing elements are deformable in response to a force which causes the distal end of the elements to contact the structural member to absorb and dissipate the energy generated by the force.

16 Claims, 4 Drawing Sheets

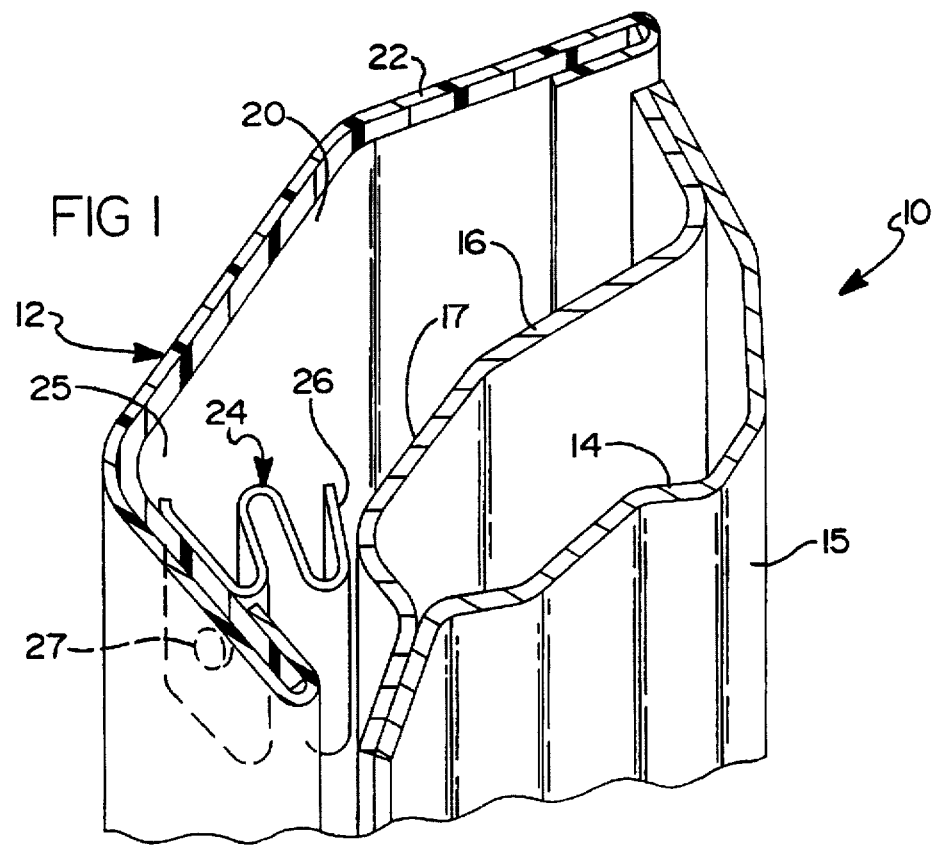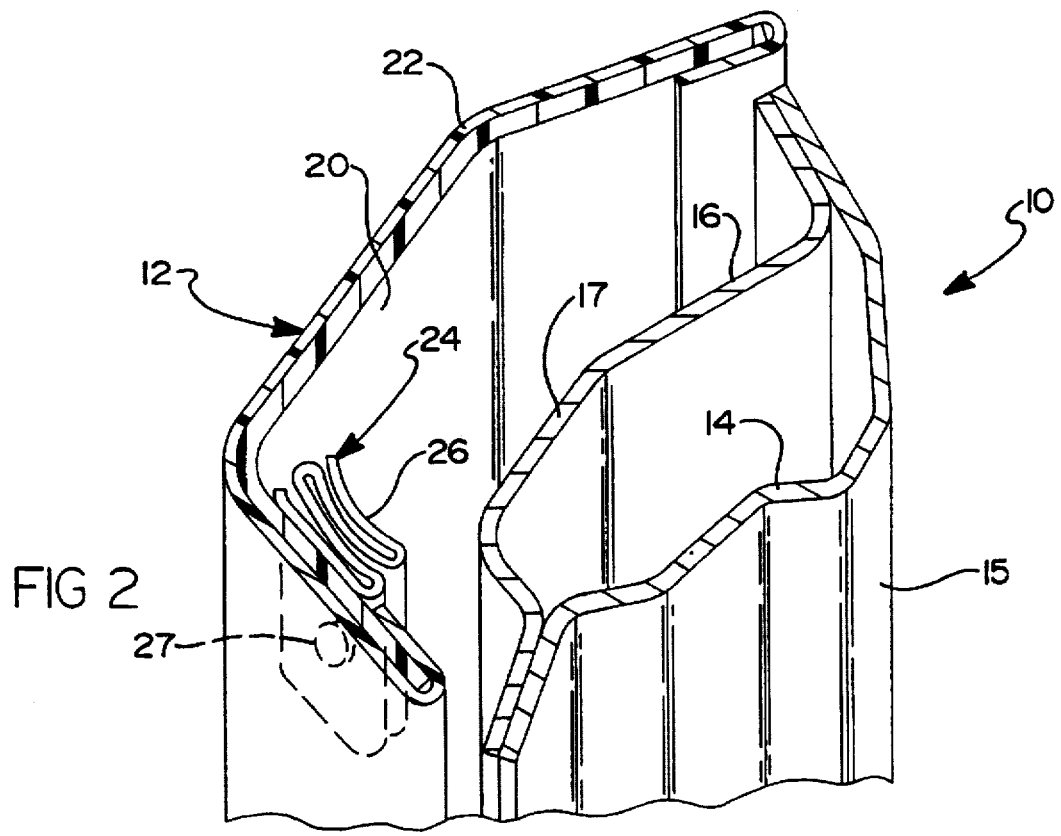

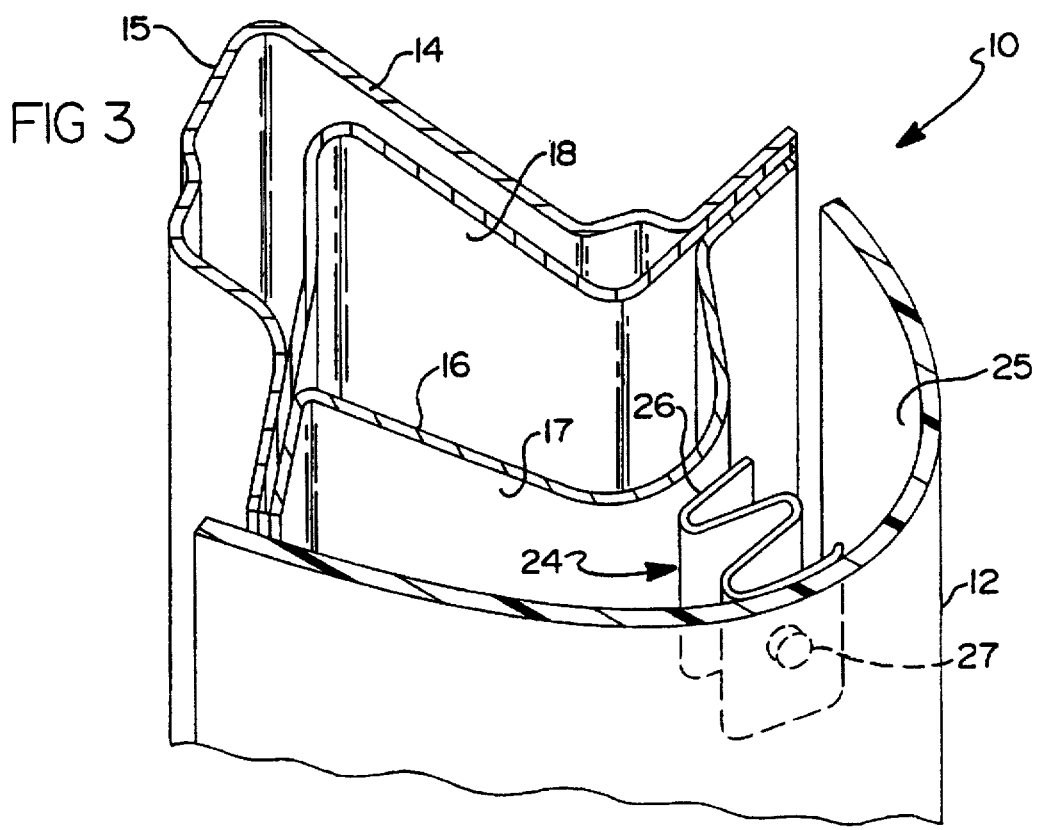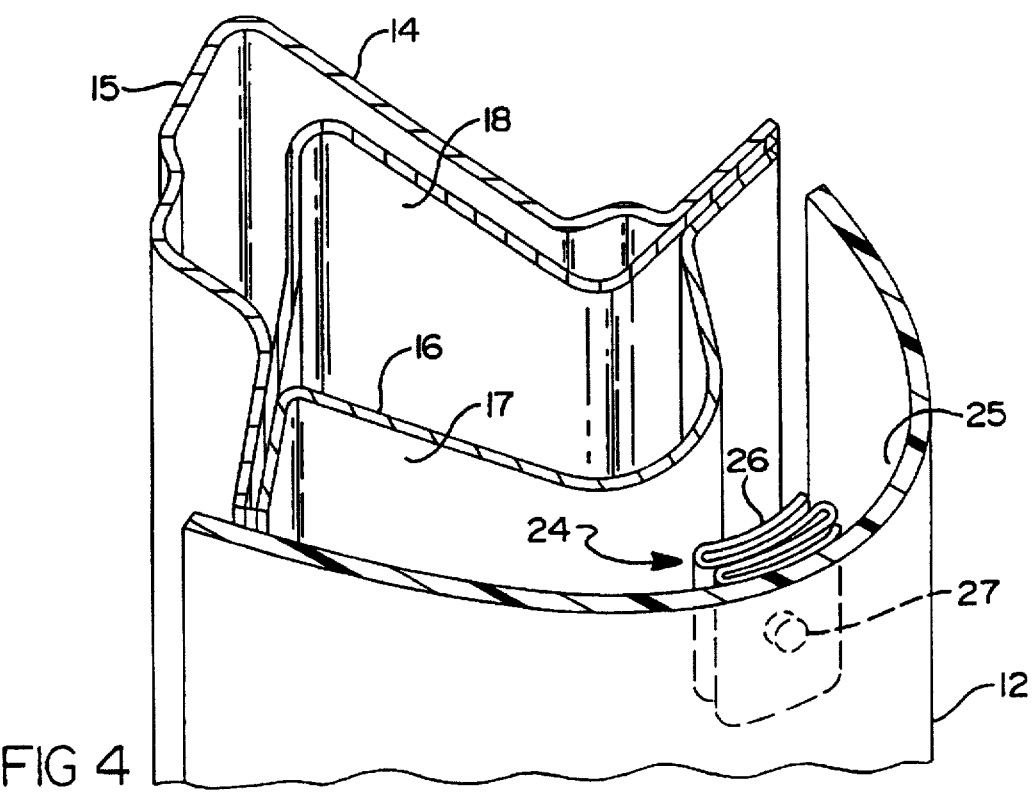

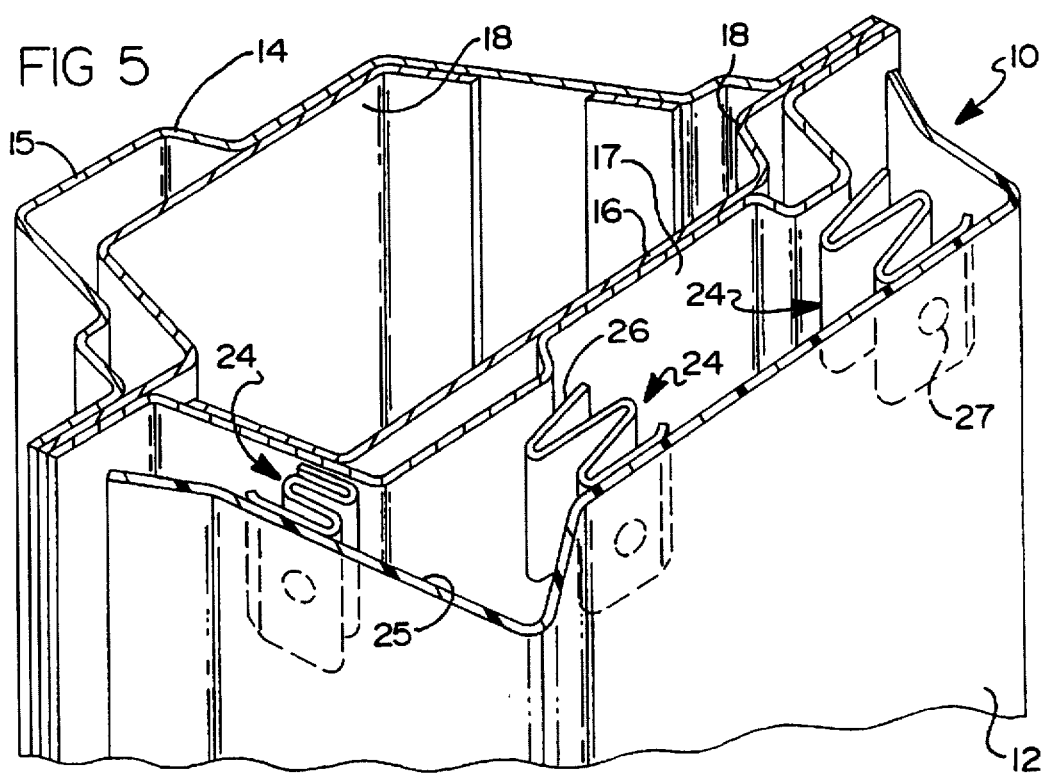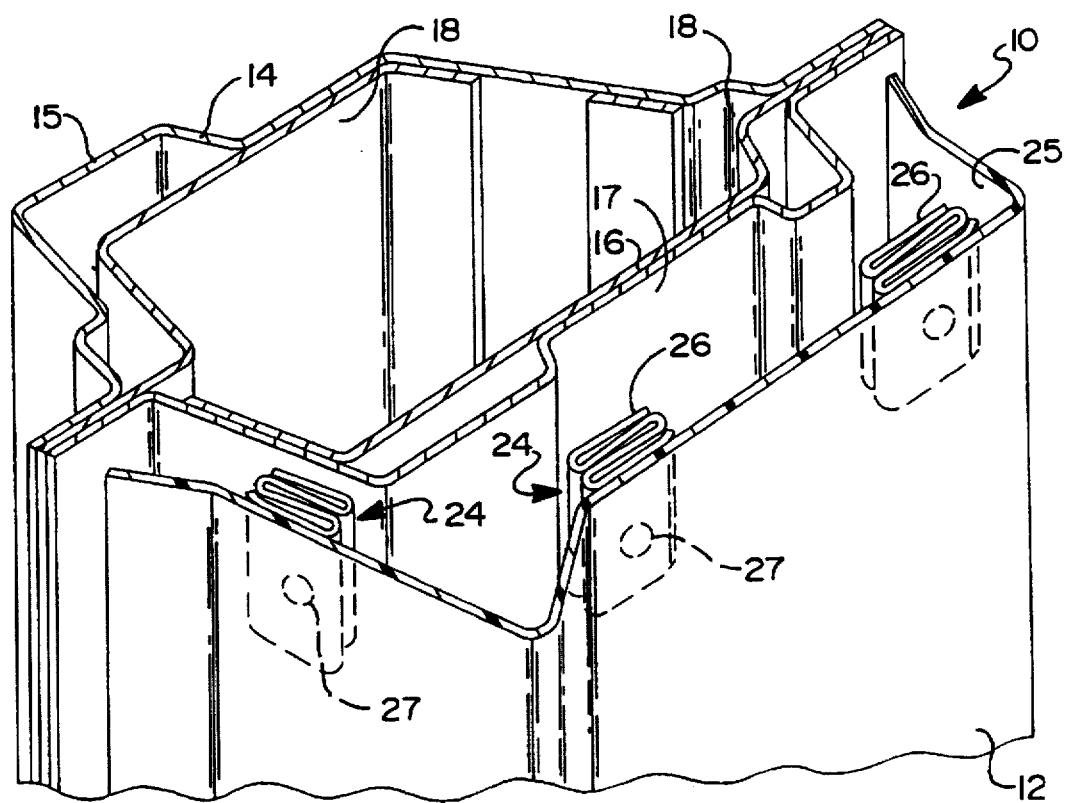

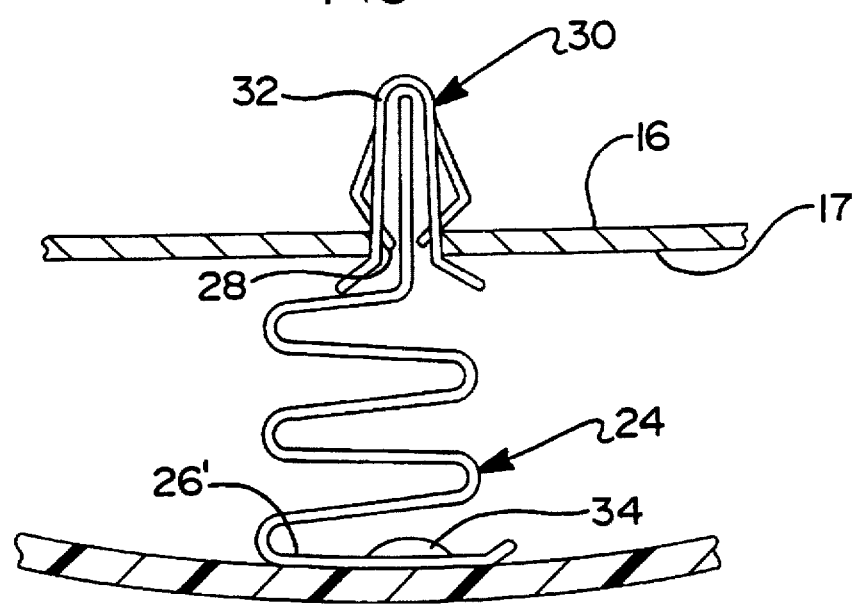
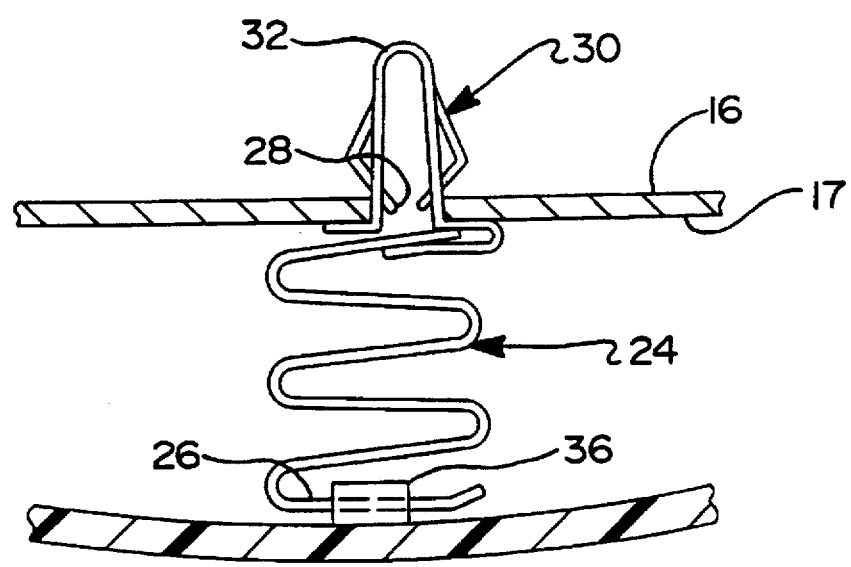

ENERGY ABSORBING AUTOMOTIVE VEHICLE BODY STRUCTURE

BACKGROUND OF THE INVENTION

1. Field of the Invention

The present invention relates generally to automotive vehicle body structure and, more specifically to the construction of automotive vehicle body structure to accommodate energy absorption.

2. Description of the Related Art

Trim components are used in automotive applications to present an aesthetically pleasing appearance in the interior of the vehicle, to smooth contours and to cover structural load-bearing components of the vehicle. For example, trim components are employed for these purposes in connection with the A, B, C, and D pillars of the vehicle, the side rails and the roof rails or the front and rear headers.

In the design of modern automotive vehicles, it has been a goal to provide body structures which manage the absorption of energy in response to the imposition of frontal loads. More recent activity in the vehicle body arts has been directed to the management of energy imposed on the vehicle occupant compartment in response to loads imposed on the sides of the vehicle and to loading imposed within the vehicle occupant component.

Thus, in addition to the load-bearing functions of such structural components of the vehicle, these body structures are sometimes required to absorb energy from forces generated from the interior of the vehicle in the event of an impact or collision. It has been found that there is a need in the art for load-bearing structural members such as pillars, side rails, roof rails, and front and rear headers having enhanced energy absorbing capabilities which also meet the design objectives identified above without sacrificing the interior space of the vehicle.

SUMMARY OF THE INVENTION

The present invention meets the needs of the art in an energy absorbing automotive vehicle body structure. More specifically, the present invention is directed toward a structural member, such as a pillar, which forms a load-bearing portion of the vehicle. A trim component is mounted to the pillar. A plurality of energy absorbing elements are mounted to the trim component and spaced relative to one another along the longitudinal length of the trim component. Each of the energy absorbing elements have a serpentine shape and extend from the trim component toward the pillar such that the distal end of the energy absorbing elements are spaced from, but adjacent to, the pillar in non-contacting relationship therewith. The energy absorbing elements are deformable in response to a force which causes the distal end of the elements to contact the structural member to absorb and dissipate the energy generated by the force.

One feature of the present invention is that it may be employed in connection with all structural, load-bearing members of an automotive vehicle on which a trim component is mounted and is especially adapted for use in connection with upper structural components such as A, B, C, and D pillars. Another feature of the present invention is that it effectively absorbs and dissipates energy generated due to the force of the impact without sacrificing the interior space of the vehicle. Still another feature of the present invention is that it can be easily implemented in production, is simple and cost-effective to manufacture.

Other features and advantages of the present invention will be readily appreciated as the same becomes better understood after reading the subsequent description when considered in connection with the accompanying drawings.

BRIEF DESCRIPTION OF THE DRAWINGS

FIG. 1 is a perspective view of the structural member of the present invention with a cross-section taken therethrough.

FIG. 2 is a perspective view of a structural member of FIG. 1 illustrating the energy absorbing features thereof upon impact.

FIG. 3 is a perspective view of another embodiment of the structural member of the present invention with a cross-section taken therethrough.

FIG. 4 is a perspective view of the structural member of FIG. 3 illustrating the energy absorbing features thereof upon impact.

FIG. 5 is a perspective view of another embodiment of the structural member of the present invention with a cross-section taken therethrough.

FIG. 6 is a perspective view of the structural member of FIG. 5 illustrating the energy absorbing features thereof upon impact.

FIG. 7 is a cross-sectional side view of the energy absorbing element of the present invention mounted to the inner panel of the pillar of the structural member.

FIG. 8 is a cross-sectional side view of another embodiment of the energy absorbing element of the present invention mounted to the inner panel of the pillar of the structural member.

DESCRIPTION OF THE PREFERRED EMBODIMENT(S)

The present invention is directed toward an energy absorbing automotive vehicle body structural member generally indicated at 10 throughout the figures. Trim components 12 are often employed in connection with structural components 10 on automotive vehicles. The structural components 10 often associated with interior trim components may include A, B, C, and D pillars as well as side and roof rails. It will be appreciated, however, that the structural member 10 having a trim component 12 mounted thereto of the present invention may be employed at many locations in a vehicle to present an aesthetically pleasing appearance in the interior of the vehicle.

As illustrated in the figures, the structural member is a pillar 10 which forms a load-bearing structure on the vehicle (not shown). The pillar 10 includes an outer panel 14 and an inner panel 16. The panels 14 and 16, respectively, are fixedly secured to one another at their lateral edges such as by welding to form the load-bearing pillar. As illustrated in the figures, the outer panel 14 is arranged in a generally vertical orientation to define an outwardly convex exterior surface 15 of the vehicle. Similarly, the inner panel 16 is arranged in longitudinal registration with the outer panel 14 and defines a surface 17 which is convex with respect to the interior of the vehicle. As illustrated in FIG. 3–7, the pillar 10 may include at least one or more reinforcement panels 18 disposed between the inner and the outer 14 panels 16 and 14.

A trim component 12 is mounted to the pillar 10. The trim component 12 is typically made of plastic and presents a class A surface in the interior of the vehicle. As illustrated in FIG. 1, the trim component 12 may include a plastic substrate 20 which is covered by an aesthetically pleasing material such as a cloth, leather or a plastic skin 22. The trim component 12 is mounted to the pillar 10 using conventional fasteners well known in the art.

A plurality of energy absorbing elements, generally indicated at 24, are mounted to the trim component 12 and are spaced relative to one another along the longitudinal length of the trim component 12. As shown in FIGS. 1–6, the energy absorbing elements 24 are heat seated at 27 to the trim panel and spaced at approximately 4 inch intervals along the longitudinal length thereof. In addition, and as illustrated in FIGS. 5–6, the energy absorbing elements 24 may be spaced relative to one another laterally across the generally concave surface 25 of the width of the trim component 12.

The energy absorbing elements 24 have a serpentine shape and extend from the concave inner surface 25 of the trim component 12 toward the convex surface 17 of the inner panel 16 of the pillar 10 such that the distal ends 26 of the elements 24 are spaced from, but adjacent to, the inner panel 16 in non-contacting relationship therewith. Thus, there is a clearance between the sheet metal of the inner panel 16 and the energy absorbing element 24 in order to reduce the possibility of squeak, rattle or any other variation during assembly.

The energy absorbing elements 24 are made of flat energy absorbing material which is bent so as to define a serpentine shape wherein the energy absorbing material is collapsible onto itself in response to a force which causes the distal ends 26 thereof to contact the inner panel 16 of the pillar 10. Accordingly, the energy absorbing elements 24 may be manufactured from stainless steel, spring steel, plastic, or any other suitable material.

In another embodiment, shown in FIGS. 7–8, the inner panel 16 may include an aperture 28. A plurality of mounting clips are generally indicated at 30. Each of the mounting clips 30 include a portion 32 which extends through the aperture 28 and fixedly secures the mounting clips 30 to the inner panel 16. As in the embodiment shown in FIGS. 1–6, the energy absorbing elements 24 of FIGS. 7–8 are carried by a plurality of the mounting clips 30 mounted to the inner panel 16 such that they are spaced relative to one another along the longitudinal length of the inner panel 16 of the pillar 10. Additionally, the energy absorbing elements shown in FIGS. 7 and 8 may also be spaced relative to one another laterally across the generally convex surface 17 of the inner panel 16 of the pillar 10. The other end of the energy absorbing elements 24 may be heat seated at 34 to the trim component 12 as indicated in FIG. 7. Optionally, the trim component may include a boss 36 having an aperture which captures the distal end 26 of the energy absorbing element 24.

The energy absorbing elements 24 are deformable in response to the force which causes the distal ends 26, 26' of the elements to contact the inner panel 16 or otherwise to absorb and dissipate the energy generated by the force. More specifically, and during the impact, the trim component 12 flexes and begins to absorb the impact energy. As the trim component 12 flexes, the energy absorbing element 24 begins to collapse and absorb more of the impact energy, reducing the impact speed before touching the inner panel 16 of the pillar 10. Furthermore, the energy absorbing elements 24 may be arranged to maximize absorption of energy in the likely direction of the forces that will be imparted to the pillar 10 in the event of a collision. Those having skill in the art will appreciate that the energy absorbing elements 24 may be arranged in any suitable manner and that their exact position will be dictated by a number of design and/or engineering criteria. Furthermore, the stiffness of the energy absorbing elements may be engineered to a desired level.

In this way, the energy absorbing element 24 of the present invention responds to forces acting thereon to absorb and dissipate the energy generated by the force. Further, these objectives and advantages are achieved in connection with an aesthetically pleasing trim component 12 which covers the structural member without sacrificing the interior space of the vehicle. Additionally, these objectives are obtained through the present invention which is simple and cost-effective to manufacture.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. An automotive vehicle body structure comprising:

a structural member which forms a load-bearing portion of a vehicle, a trim component mounted to said structure member; and a plurality of energy absorbing elements mounted to said trim component and spaced relative to one another along a longitudinal length of said trim component and laterally across the width of said trim component, each of said energy absorbing elements having a serpentine shape and extending from said trim component toward said structural member such that a distal end of said energy absorbing elements are spaced from, but adjacent to, said structural member in non-contacting relationship therewith, said energy absorbing element being deformable in response to a force which causes said distal end of said elements to contact said structural member to absorb and dissipate the energy generated by the force.

2. An automotive vehicle body structure as set forth in claim 1 wherein said energy absorbing elements are made of flat energy absorbing material which is bent so as to define a serpentine shape wherein the energy absorbing material is collapsible onto itself in response to a force which causes said distal end thereof to contact said structural member.

3. An automotive vehicle body structure as set forth in claim 2 wherein said energy absorbing element is manufactured from stainless steel.

4. An automotive vehicle body structure as set forth in claim 2 wherein said energy absorbing element is manufactured from spring steel.

5. An automotive vehicle body structure as set forth in claim 2 wherein said energy absorbing element is manufactured from plastic.

6. An automotive vehicle body structure as set forth in claim 1 wherein said energy absorbing elements are heat seated to said trim panel.

7. An automotive vehicle body structure as set forth in claim 1 wherein said structural member includes a pillar having an outer panel and an inner panel, said panels fixedly secured to one another to form said load-bearing structural member.

8. An automotive vehicle body structure as set forth in claim 7 wherein said pillar includes at least one reinforcement panel disposed between said inner and said outer panels.

9. An automotive vehicle body structure as set forth in claim 7 wherein said outer panel is arranged in generally vertical orientation to define an outwardly convex exterior surface of the vehicle; and said inner panel is arranged in longitudinal registration with the outer panel and defines a surface which is convex with respect to the interior of the vehicle.

10. An automotive vehicle body structure comprising:

a pillar which forms a load-bearing structure on a vehicle, said pillar including an outer panel and an inner panel, said panels fixedly secured to one another to form said load-bearing pillar, a trim component mounted to said inner panel of said pillar;

said inner panel including an aperture, a plurality of mounting clips each having a portion extending through said aperture and fixedly securing said clip to said inner panel; and a plurality of energy absorbing elements carried by said plurality of said mounting clips mounted to said inner panel and spaced relative to one another along a longitudinal length of said inner panel, said energy absorbing elements having a serpentine shape and extending from said inner panel toward said trim component with said distal end of said energy absorbing element being attached to said trim component, said energy absorbing element being deformable in response to a force which causes said element to collapse onto itself thereby absorbing and dissipating the energy generated by the force.

11. An automotive vehicle body structure as set forth in claim 10 wherein said outer panel is arranged in generally vertical orientation to define an outwardly convex exterior surface of the vehicle;

said inner panel arranged in longitudinal registration with the outer panel and defining a surface which is convex with respect to the interior of the vehicle.

12. An automotive vehicle body structure comprising:

a pillar which forms a load bearing structure on a vehicle, said pillar including an outer panel and an inner panel, said panels fixedly secured to one another to form said load-bearing pillar, a trim component mounted to said inner panel of said pillar;

said outer panel being arranged in generally vertical orientation to define an outwardly convex exterior surface of the vehicle, said inner panel being arranged in a longitudinal registration with the outer panel and defining a surface which is convex with respect to the interior of the vehicle;

said inner panel including an aperture, a plurality of mounting clips each having a portion extending through said aperture and fixedly securing said clip to said inner panel; and a plurality of energy absorbing elements carried by said plurality of said mounting clips mounted to said inner panel and spaced relative to one another along a longitudinal length of said inner panel and relative to each other laterally about the generally convex surface of said inner panel, said energy absorbing elements having serpentine shape and extending from said inner panel toward said trim component with said distal end of said energy absorbing elements being attached to said trim component, said energy absorbing elements being deformable in response to a force which causes said element to collapse onto itself thereby absorbing and dissipating the energy generated by the force.

13. An automotive vehicle body structure as set forth in claim 10 wherein said energy absorbing elements are made of flat energy absorbing material which is bent so as to define a serpentine shape wherein the energy absorbing material is collapsible onto itself in response to a force which causes said distal end thereof to contact said structural member.

14. An automotive vehicle body structure as set forth in claim 13 wherein said energy absorbing element is manufactured from stainless steel.

15. An automotive vehicle body structure as set forth in claim 13 wherein said energy absorbing element is manufactured from spring steel.

16. An automotive vehicle body structure as set forth in claim 13 wherein said energy absorbing element is manufactured from plastic.

* * * * *